(12) United States Patent
Edamatsu et al.

(10) Patent No.: US 9,239,974 B2
(45) Date of Patent: Jan. 19, 2016

(54) INFORMATION PROCESSING APPARATUS AND RECORDING MEDIUM

(71) Applicant: Konica Minolta, Inc., Chiyoda-ku (JP)

(72) Inventors: Tatsuo Edamatsu, Kobe (JP); Ryuichi Miyashita, Itami (JP); Yoshiyuki Harada, Saitama (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/943,952

(22) Filed: Jul. 17, 2013

(65) Prior Publication Data

US 2014/0022579 A1    Jan. 23, 2014

(30) Foreign Application Priority Data

Jul. 18, 2012  (JP) ................................. 2012-159277

(51) Int. Cl.
  *G06F 3/12*  (2006.01)
  *G06K 15/02*  (2006.01)
  *G06K 15/00*  (2006.01)

(52) U.S. Cl.
  CPC .......... *G06K 15/1805* (2013.01); *G06F 3/1204* (2013.01); *G06F 3/1255* (2013.01); *G06F 3/1285* (2013.01); *G06F 3/1297* (2013.01); *G06K 15/00* (2013.01); *G06F 3/1296* (2013.01)

(58) Field of Classification Search
  USPC .............................. 358/1.13, 1.14, 1.15, 1.16
  See application file for complete search history.

(56) References Cited

U.S. PATENT DOCUMENTS 7,103,849 B2 *  9/2006  Aikawa .......................... 715/777
8,564,797 B2 * 10/2013  Naitoh .......................... 358/1.13

2008/0007758 A1   1/2008  Miyashita
2008/0263570 A1  10/2008  Fukasawa
2009/0228822 A1   9/2009  Miyata
2011/0116131 A1   5/2011  Mitsui

FOREIGN PATENT DOCUMENTS

| JP | 2008-9901 A | 1/2008 |
| JP | 2008-269160 A | 11/2008 |
| JP | 2009-217472 A | 9/2009 |
| JP | 2010-40002 A | 2/2010 |
| JP | 2010-244317 A | 10/2010 |
| JP | 2011-022679 A | 2/2011 |
| JP | 2011-133995 A | 7/2011 |
| JP | 2012-59106 A | 3/2012 |

OTHER PUBLICATIONS

Office Action (Examiner's Decision to Grant a Patent) issued on Dec. 9, 2014, by the Japan Patent Office in corresponding Japanese Patent Application No. 2012-159277, and an English Translation of the Office Action. (6 pages).

* cited by examiner

*Primary Examiner* — Vu B Hang
(74) *Attorney, Agent, or Firm* — Buchanan Ingersoll & Rooney PC

(57) ABSTRACT

An information processing apparatus for customizing a printer driver includes a receiving unit, a detection unit, and a notification unit. The receiving unit receives a fixing instruction to fix a specific setting item on the printer driver at a specific setting through operation input from an operator. The detection unit detects a setting that is a setting of a different setting item from the specific setting item and that is in a prohibited relationship with the specific setting as a corresponding prohibited setting resulting from the fixing instruction. The notification unit notifies the operator of the corresponding prohibited setting detected by the detection unit.

14 Claims, 9 Drawing Sheets

Fig.4

| SETTING | GUI FIXATION |
|---|---|
| PAGE LAYOUT | NO |
| SEQUENCE | NO |
| BORDER | NO |
| ROTATE 180 DEGREES | NO |
| BLANK CONTROL | NO |
| CHAPTER DIVISION | NO |
| PRINT TYPE | |
| 1-SIDED | NO |
| 2-SIDED | FIXED (GRAYED OUT) |
| BOOKLET | NO |
| OPEN DIRECTION/BINDING DIRECTION | |
| AUTOMATIC | NO |
| LEFT BINDING | NO |
| RIGHT BINDING | NO |
| TOP BINDING | NO |

Tabs: BASIC | LAYOUT | FINISH | COVER/INSERT SHEET | STAMP/PAGE PRINT | QUALITY | OTHER

GUI FIXATION SETUP

Buttons: SET PROHIBITION SITUATION DISPLAY..., OK, CANCEL

INFORMATION PROCESSING APPARATUS AND RECORDING MEDIUM

This application is based on Japanese Patent Application No. 2012-159277 filed on Jul. 18, 2012, the contents of which are hereby incorporated by reference.

BACKGROUND OF THE INVENTION

1. Technical Field

The present invention relates to a non-transitory computer-readable recording medium storing a program for customizing a printer driver and a technique related thereto.

2. Background Art

Some printer drivers can be customized by their administrators. For example, Japanese Patent Application Laid-Open No. 2010-040002 (Patent Document 1) discloses a technique for fixing the settings of some setting items on a printer driver, using a program for customizing a printer driver (also referred to as the "customization program"). To be more specific, Patent Document 1 discloses a technique for fixing a specific setting item (e.g., "Print Type") at a specific setting (e.g., "Two-Sided Printing") in accordance with operation input from an administrator (in other words, preventing the specific setting item from being changed to a setting other than the specific setting). For example, when the setting item "Print Type" on a printer driver is fixed to "Two-Sided Printing", print processing in an image forming apparatus is always executed with the setting "Two-Sided Printing," and thus it is possible to reduce the cost of printing such as paper.

Meanwhile, there is a plurality of settings of different setting items that cannot be used in combination (hereinafter, "prohibited settings" or "prohibited conditions") due to functional limitations and/or the specifications of the apparatus. In other words, there are prohibited conditions concerning prohibited combinations of a plurality of settings.

When a specific setting item on a printer driver is fixed at a specific setting, there can possibly be a setting that is in a prohibited relationship with the specific setting. For example, when the setting item "Print Type" is fixed at "Two-Sided Printing," relatively small paper (e.g., "A6" size paper) cannot be used, and as a result, settings such as "A6" of a setting item "Paper Size" become prohibited settings.

In view of this, Patent Document 1 described above discloses a technique used in a printer driver for graying out (disabling) options corresponding to settings that are unavailable due to prohibition processing (settings that meet prohibited conditions). In other words, Patent Document 1 discloses a technique for preventing settings that are in a prohibited relationship with the specific setting of the specific setting item fixed upon receipt of an instruction to fix the specific setting item (fixing instruction) from being selected on setting screens of the printer driver.

Incidentally, in situations where a printer driver is customized by an administrator as described above, it is preferable for the administrator to know settings that are in a prohibited relationship with a specific setting item fixed at a specific setting (settings of different setting items from the specific setting item). In other words, it is preferable for the administrator to know settings in the printer driver that are made unavailable upon receipt of the fixing instruction.

However, in the case of using the technique of Patent Document 1 described above, normally, the administrator customizes a printer driver using the aforementioned customization program and then distributes the customized printer driver to users of the printer driver. At last the users of the printer driver know the presence of settings that are made unavailable as a result of fixing processing (customization processing) at the stage of using the printer driver. In other words, the administrator or the like who has customized the printer driver cannot know settings that will be made unavailable as a result of fixing processing, at the stage before the printer driver is used.

SUMMARY OF THE INVENTION

It is an object of the present invention to provide a technique for enabling a user to know, even before a printer driver is used, settings that will be made unavailable in the printer driver as a result of a specific setting item on the printer driver being fixed at a specific setting.

According to a first aspect of the present invention, a non-transitory computer-readable recording medium stores a program for customizing a printer driver, the program causing a computer to execute the steps of a) receiving a fixing instruction to fix a specific setting item on the printer driver at a specific setting through operation input from an operator, b) detecting a setting that is a setting of a different setting item from the specific setting item and that is in a prohibited relationship with the specific setting, as a corresponding prohibited setting resulting from the fixing instruction, and c) notifying the operator of the corresponding prohibited setting detected in the step b).

According to a second aspect of the present invention, an information processing apparatus for customizing a printer driver includes a reception unit configured to receive a fixing instruction to fix a specific setting item on the printer driver at a specific setting through operation input from an operator, a detection unit configured to detect a setting that is a setting of a different setting item from the specific setting item and that is in a prohibited relationship with the specific setting, as a corresponding prohibited setting resulting from the fixing instruction, and a notification unit configured to notify the operator of the corresponding prohibited setting detected by the detection unit.

These and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Hereinafter, embodiments of the present invention will be described with reference to the drawings.

1. Overview of System Configuration

Figure 1:
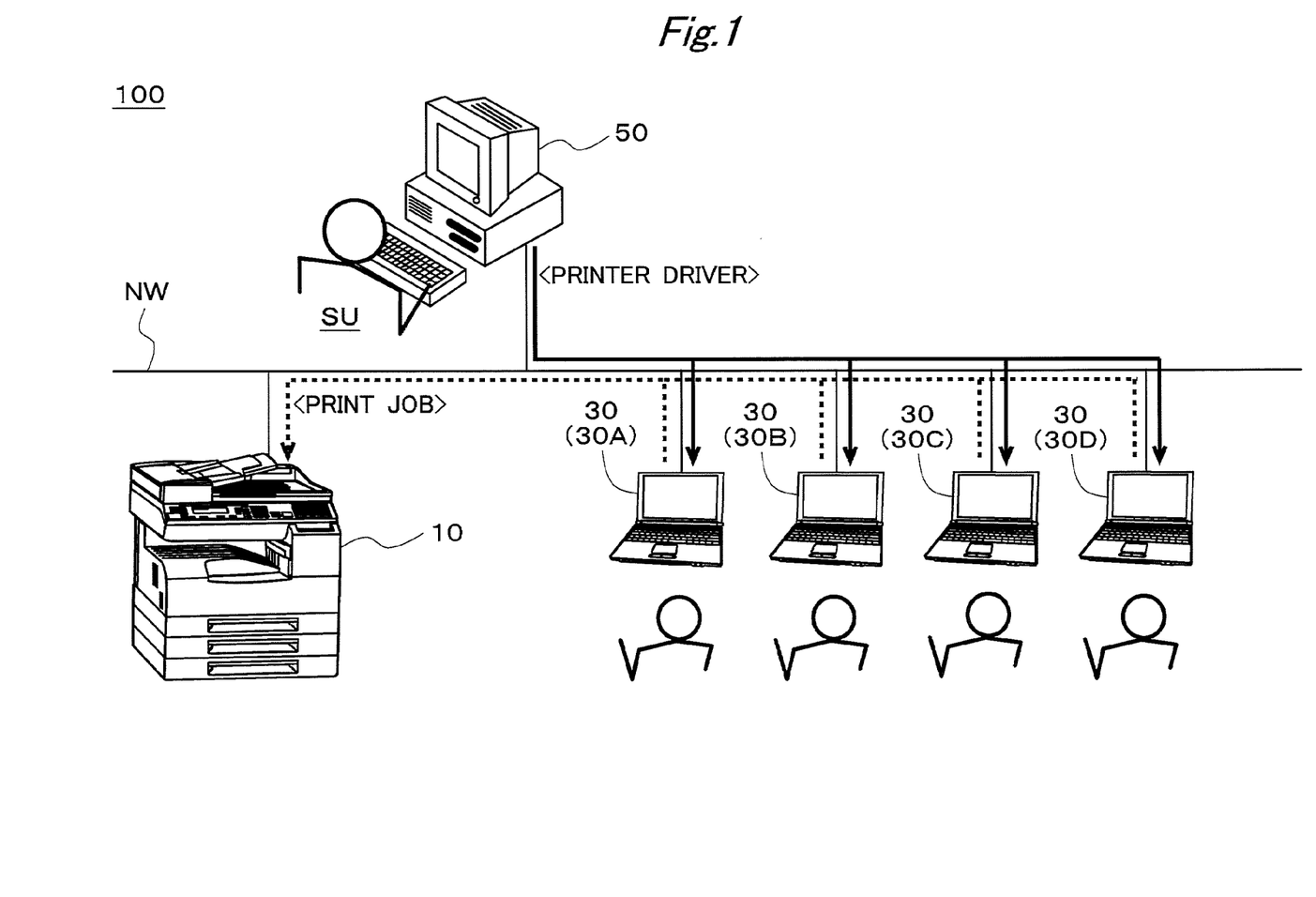
FIG. 1 illustrates a schematic configuration of a printing system.

FIG. 1 is a schematic diagram illustrating a configuration of a printing system 100 that includes a printing apparatus 10, client computers 30 (30A, 30B, 30C, and 30D), and an administrator computer 50. The printing apparatus 10 is connected to the client computers 30 via a network NW and is able to exchange data with the client computers 30. The client computers 30 are each connected to the administrator computer 50 via the network NW and are able to exchange data with the administrator computer 50. Note that the network NW includes various types of networks such as a local area network (LAN) and the Internet.

The printing apparatus 10 functions as a printer that executes print jobs received from the client computers 30. Specifically, the client computers 30 each transmit a print job to the printing apparatus 10 via a printer driver (software program) PD or the like installed in the client computers 30. The printing apparatus 10 receives such print jobs transmitted from the client computers 30 and executes the print jobs. In this way, the printing apparatus 10 executes printout processing.

The administrator computer 50 is a computer (information processing apparatus) used by an administrator of the printer driver PD (hereinafter, the "administrator SU"). A control program (also referred to as the "printer driver control program" or "customization program") PG1 (described later) for customizing the printer driver PD is installed in the administrator computer 50. The customization program PG1 is installed in the administrator computer 50 via, for example, a portable recording media such as USB memories (in other words, various types of non-transitory computer-readable recording media) or via the network NW or the like. Using the customization program PG1, the administrator computer 50 executes processing for customizing the printer driver PD (specifically, a graphical user interface (GUI) of the printer driver, and more specifically, a print setting screen or the like). The administrator computer 50 then distributes (transmits) the customized most up-to-date printer driver PD to the client computers 30. The client computers 30 install the most up-to-date printer driver PD transmitted from the administrator computer 50 and execute a printing setting operation or the like using the printer driver PD.

Figure 2:
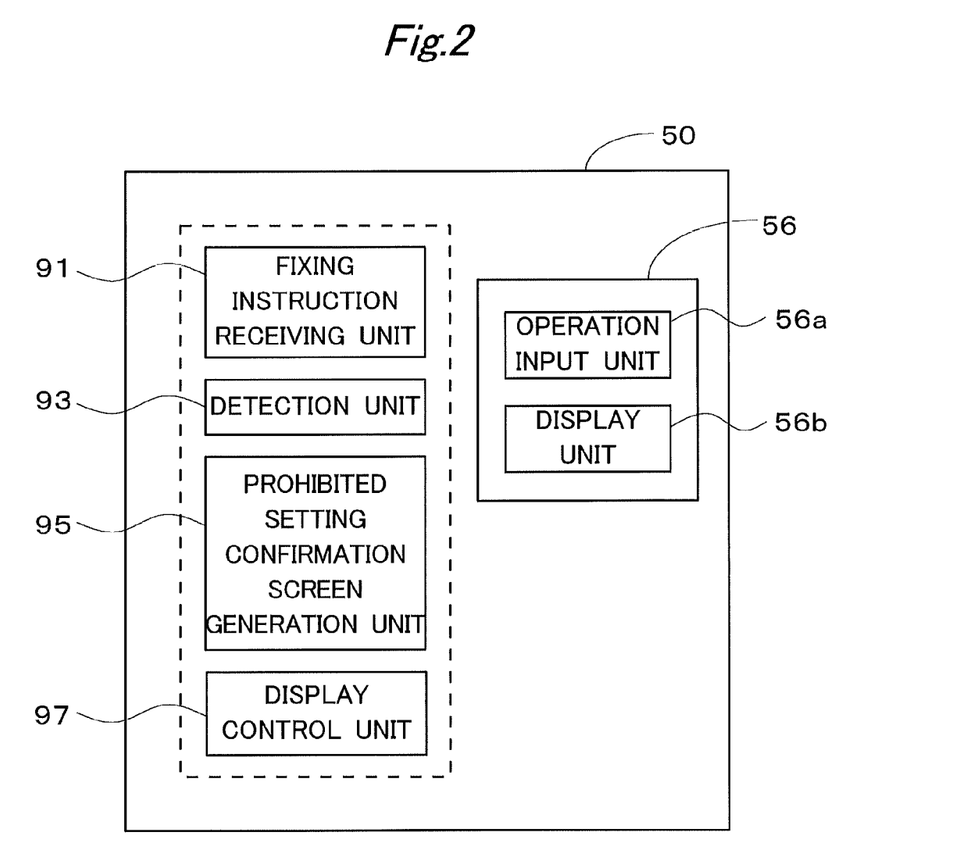
FIG. 2 is a block diagram illustrating a functional configuration of an administrator computer.

FIG. 2 is a block diagram illustrating a functional configuration of the administrator computer 50.

The administrator computer 50 is configured as a so-called personal computer.

The administrator computer 50 includes an input/output unit 56. The input/output unit 56 includes an operation input unit 56a that receives operation input to the administrator computer 50, and a display unit 56b that displays and outputs various types of information. Examples of the operation input unit 56a include a keyboard and a mouse, and one example of the display unit 56b is a liquid crystal display device.

The administrator computer 50 further includes, for example, a CPU and a semiconductor memory. The administrator computer 50 implements various types of processing units by the CPU executing the above-described printer driver control program PG1. Specifically, the administrator computer 50 implements various types of processing units such as a fixing instruction receiving unit 91, a detection unit 93, a prohibited setting confirmation screen generation unit 95, and a display control unit 97 as illustrated in FIG. 2.

The fixing instruction receiving unit 91 is a processing unit configured to receive a fixing instruction to fix a specific setting item on the printer driver PD at a specific setting through operation input from the administrator SU. In other words, the fixing instruction receiving unit 91 receives, as the fixing instruction, an instruction to prevent a specific setting item on the printer driver PD from being changed to a setting other than the specific setting.

The detection unit 93 is a processing unit configured to detect settings KS that are settings of different setting items from the specific setting item fixed at the specific setting by the fixing instruction receiving unit 91 and that are in a prohibited relationship with the specific setting. Here, the "prohibited relationship" refers to a relationship (situation) in which a plurality of settings of different setting items cannot be set in combination due to functional limitations and/or the specifications of the apparatus. One example of the prohibited relationship is a combination of a setting "2-Sided" of a setting item "Print Type" and a setting "A6" of a setting item "Original Size".

The settings KS detected by the detection unit 93 are prohibited settings that result from a fixing instruction to fix a specific setting item at a specific setting and that correspond to the specific setting. Thus, the settings KS are also referred to as "corresponding prohibited settings" KS.

The prohibited setting confirmation screen generation unit 95 is a processing unit configured to generate a prohibited setting confirmation screen GB. The prohibited setting confirmation screen GB is a screen displaying the corresponding prohibited settings KS detected by the detection unit 93.

The display control unit 97 controls a display operation performed by the display unit 56b of the administrator computer 50. For example, the display control unit 97 controls an operation of displaying the prohibited setting confirmation screen GB (see FIG. 5) or the like on the display unit 56b of the administrator computer 50 and presenting the screen to the administrator SU (notifying the administrator SU of the screen).

2. Operation

Figure 3:
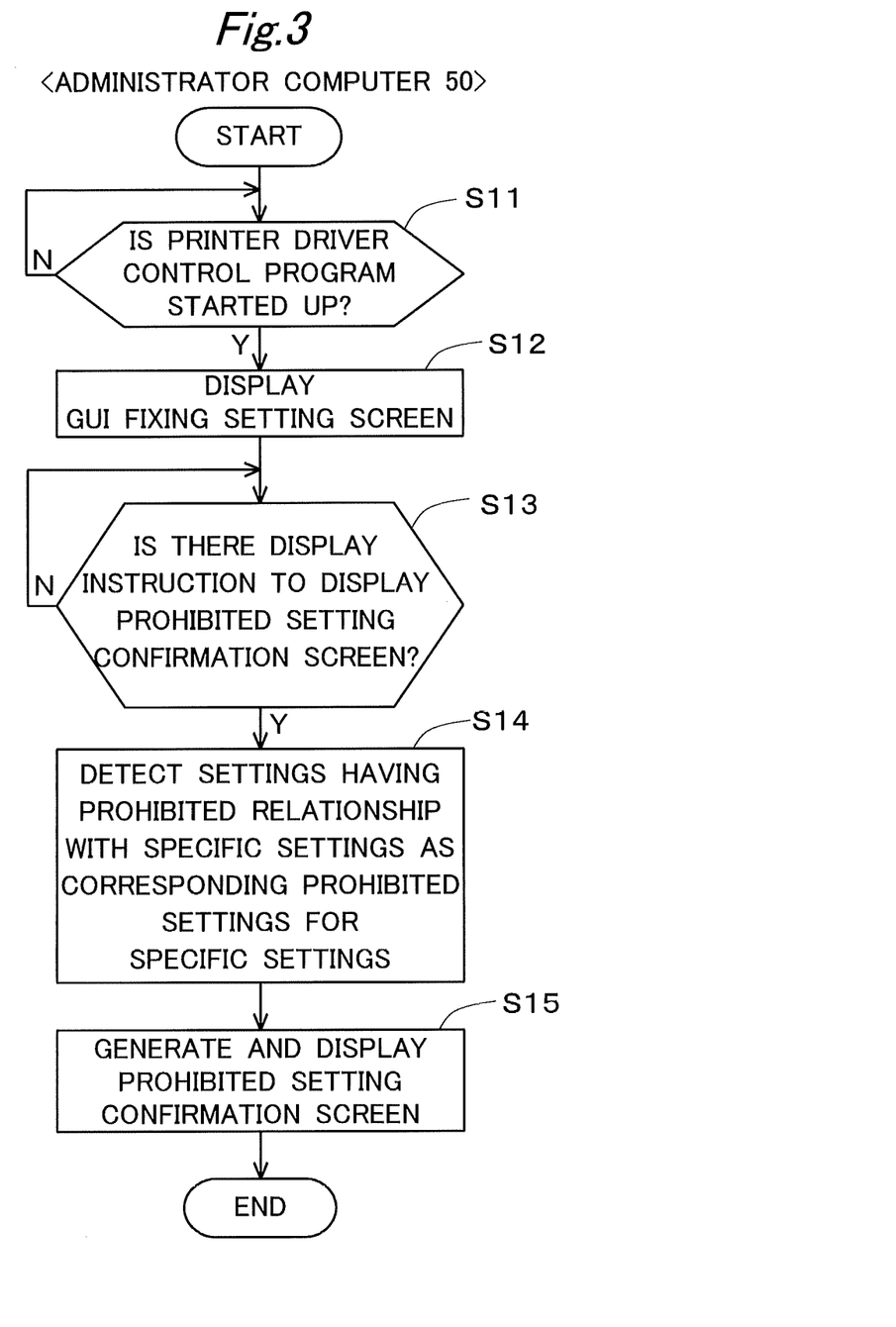
FIG. 3 is a flowchart showing operations performed by the administrator computer.

FIG. 3 is a flowchart showing the operation of the administrator computer 50. Hereinafter, the operation of the administrator computer 50 will be described with reference to FIG. 3.

Figure 4:
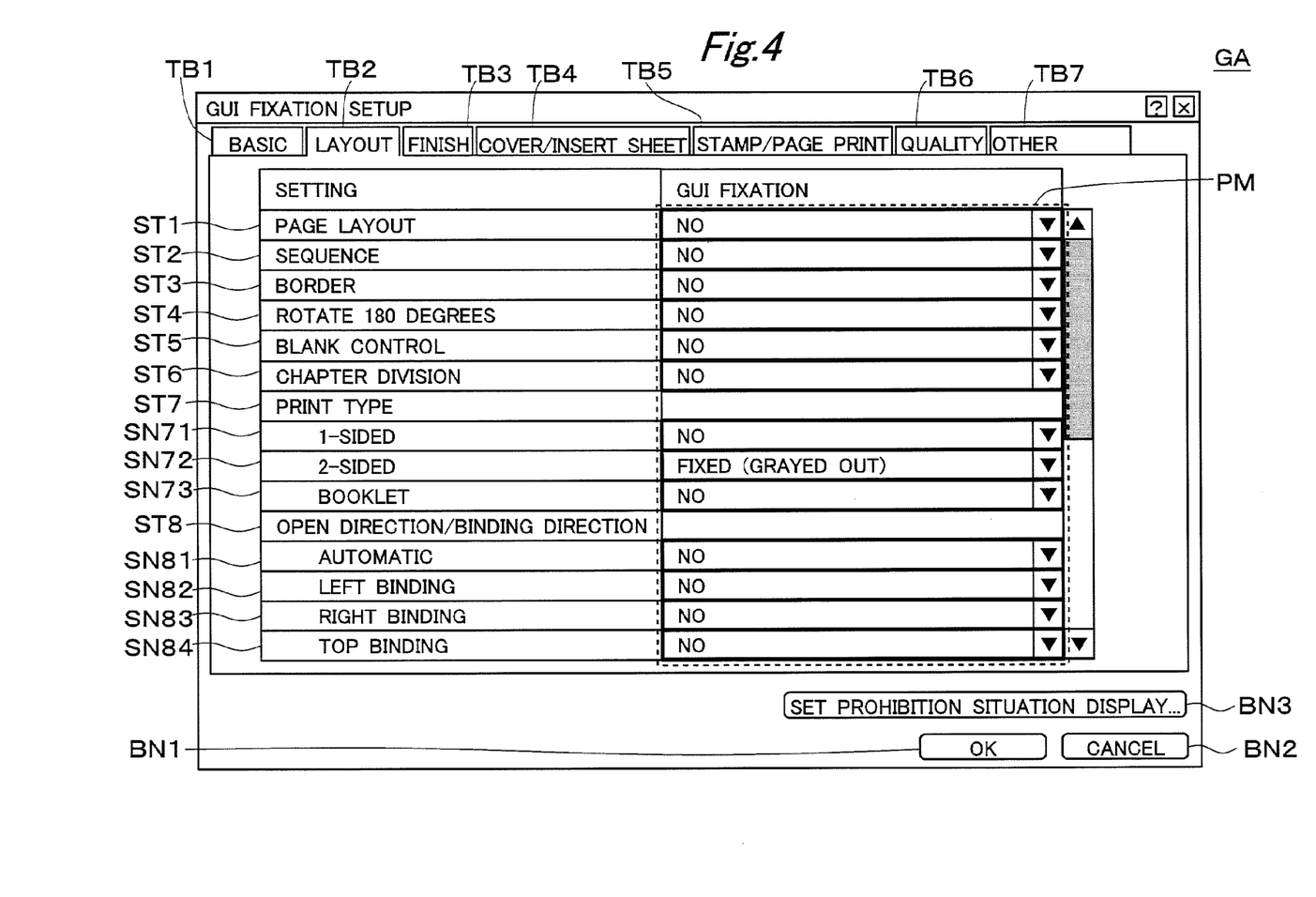
FIG. 4 illustrates a GUI fixing setting screen.

Upon receiving an instruction to execute the printer driver control program PG1, the administrator computer 50 starts up the printer driver control program PG1 (YES in step S11) and displays a setting screen for fixing a GUI (GUI fixing setting screen) GA shown in FIG. 4 on the display unit 56b (step S12). Using this GUI fixing setting screen GA, the administrator SU gives a fixing instruction regarding a desired setting item to the administrator computer 50.

The GUI fixing setting screen GA is a screen for receiving a fixing instruction to fix a specific setting item on the printer driver PD (specifically, in the GUI (printer driver screen) of the printer driver PD) at a specific setting. As illustrated in FIG. 4, the GUI fixing setting screen GA includes a plurality of tab screens TB1 to TB7.

Each tab screen TB displays, for example, predetermined setting items ST classified into a plurality of tabs according to a predetermined criterion, and settings SN of the predetermined setting items. The tab screen TB2 illustrated in FIG. 4 displays, for example, a plurality of setting items ST1 to ST8 classified under a "Layout" tab. The tab screen TB2 also displays, for example, settings SN71 to SN73 of the setting item ST7 and settings SN81 to SN84 of the setting item ST8.

Each tab screen TB also has pull-down menus PM for inputting a fixing instruction to fix the respective setting items at desired settings. The pull-down menus PM each include selection items (options) "Fixed (Grayed Out)" and "No". The administrator computer 50 receives a fixing instruction to fix a specific setting item at a specific setting through the pull-down menus PM. The former option "Fixed (Grayed Out)" indicates that the setting item is fixed, and the latter option "No" indicates that the setting item is not fixed.

Specifically, the three settings SN71 to SN73 are listed for the setting item ST7 ("Print Type") in the tab screen TB2 illustrated in FIG. 4, and a pull-down menu PM is provided for each of the settings SN71 to SN73. When an operator (the administrator or the like) has selected a desired setting from among the settings SN71 to SN73 and selected "Fixed (Grayed Out)" in the pull-down menu PM corresponding to the selected setting, the administrator computer 50 determines that a fixing instruction to fix the setting item at the selected setting has been received. For example, when "Fixed (Grayed Out)" is selected in the pull-down menu PM corresponding to the setting SN72 ("2-Sided"), the administrator computer 50 determines that a fixing instruction to fix the setting item ST7 ("Print Type") at the setting SN72 ("2-Sided") has been received.

Note that a fixing instruction as to the setting item ST8 is also given in a similar manner. In the present example, the setting items ST1 to ST6 are each set at a value (setting) of either "ON (Enabled)" or "OFF (Disabled)". The default value is "OFF (Disabled)". When "Fixed (Grayed Out)" is selected in the pull-down menu PM of any of the setting items ST1 to ST6, it is determined that a fixing instruction to fix that setting item at the setting "ON (Enabled)" has been received. For example, if "Fixed (Grayed Out)" is selected in the pull-down menu PM of the setting item ST5 "Blank Control," it is determined that a fixing instruction to fix the setting item ST5 "Blank Control" at the setting "ON (Enabled)" has been received. This forces each printer driver to use the print setting "Blank Control" at which unnecessary blank paper is less likely to be output. Thus, the cost of printing can be reduced.

Here, it is assumed that a fixing instruction to fix the setting item "Print Type" at the setting "2-Sided" has been received through the tab screen TB2 (see FIG. 4) and that a fixing instruction to fix a setting item "Copy Security" at a setting "Copy Protection" has been received through the tab screen TB5 (not shown).

Each tab screen TB also includes a plurality of buttons BN1, BN2, and BN3 as illustrated in FIG. 4.

Figure 6:
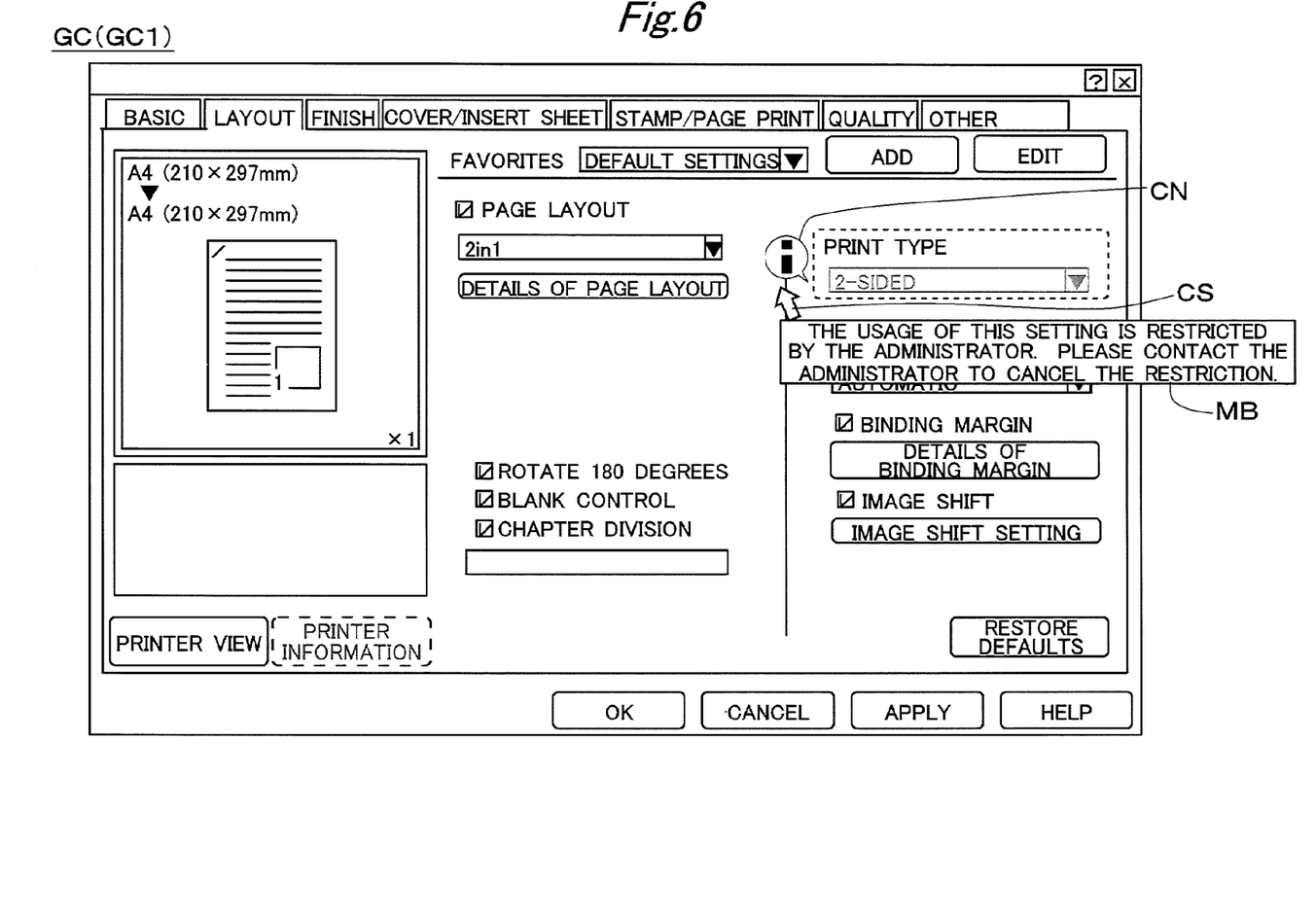
FIG. 6 illustrates a printer driver screen.

The button BN1 is a button (confirmation button) for confirming the content of fixing instructions received through the aforementioned pull-down menus PM. When the button BN1 is pressed, display data for displaying a printer driver screen (customized printer driver screen) is generated in accordance with the content of the fixing instructions. The display data includes, for example, the content of the fixing instructions. In a printer driver screen GC customized in accordance with the display data, the setting item "Print Type" is fixed at the setting "2-Sided," and the setting item "Copy Security" is fixed at the setting "Copy Protection." These fixed settings are displayed in a light color (grayed out) and cannot be changed in the customized printer driver screen GC. For example, as illustrated in FIG. 6, the setting "2-Sided" of "Print Type" (which has been fixed in the GUI fixing setting screen GA in FIG. 4) is displayed in a light color (grayed out) in the customized printer driver screen GC. Similarly, the setting "Copy Protection" of "Copy Security" is also displayed in a light color (grayed out) in the customized printer driver screen GC.

The button BN2 is a button (cancel button) for cancelling the content of fixing instructions received through the aforementioned pull-down menus. When the button BN2 is pressed, the content of fixing instructions is not reflected on the printer driver screen and discarded.

The button BN3 is a button for receiving a display instruction to display a prohibited setting confirmation screen GB (see FIG. 5) described later.

When the button BN3 is pressed, it is determined that a display instruction to display the prohibited setting confirmation screen GB (described later) has been received ("YES" in step S13 in FIG. 3), and the administrator computer 50 executes the processing of steps S14 and S15 in FIG. 3.

In step S14, the detection unit 93 detects prohibited settings (corresponding prohibited settings) KS resulting from the aforementioned fixing instructions. Specifically, the detection unit 93 detects settings that are settings of different setting items from each of the specific setting items for which the fixing instructions have been received and that are in a prohibited relationship with the specific setting of the specific setting item, as the corresponding prohibited settings KS. In short, settings that are in a prohibited relationship with the fixed settings are detected as the corresponding prohibited settings KS.

In the present example, the detection unit 93 detects settings of different setting items ("Original Size" and "Paper Type") that are in a prohibited relationship with the setting "2-Sided" of the setting item "Print Type" as corresponding prohibited settings KS1. In other words, the detection unit 93 detects settings that are settings of different setting items from the setting item "Print Type" and that are in a prohibited relationship with the setting "2-Sided" of the setting item "Print Type" as the corresponding prohibited settings KS1. That is, the corresponding prohibited settings KS1 for the setting "2-Sided" of the setting item "Print Type" are detected.

Specifically, the detection unit 93 detects settings such as "A6" and "B6" of another setting item "Original Size" as the corresponding prohibited settings KS1 (KS11) for the setting "2-Sided" of the setting item "Print Type." The detection unit 93 also detects settings such as "OHP" and "Envelope" of yet another setting item "Paper Type" as the corresponding prohibited settings KS1 (KS12) for the setting "2-Sided" of the setting item "Print Type." In this way, the settings (such as "A6," "B6," "OHP," and "Envelope") that are in a prohibited relationship with the fixed setting "2-Sided" are detected as the corresponding prohibited settings KS1.

Also, the detection unit 93 detects settings of other setting items ("Paper Type" and "Print Type") that are in a prohibited relationship with the setting "Copy Protection" of the setting item "Copy Security" as corresponding prohibited settings KS2. In other words, the detection unit 93 detects settings that are settings of different setting items from the setting item "Copy Security" and that are in a prohibited relationship with the setting "Copy Protection" of the setting item "Copy Security" as the corresponding prohibited settings KS2. That is, the corresponding prohibited settings KS2 for the setting "Copy Protection" of "Copy Security" are detected.

Specifically, the detection unit 93 detects the settings "OHP" and "Envelope" of another setting item "Paper Type" as corresponding prohibited settings KS2 (KS21) for the setting "Copy Protection" of the setting item "Copy Security." The detection unit 93 also detects a setting "Booklet" of yet another setting item "Print Type" as a corresponding prohibited setting KS2 (KS22) for the setting "Copy Protection" of the setting item "Copy Security." In this way, the settings ("OHP," "Envelope," and "Booklet") that are in a prohibited relationship with the fixed setting "Copy Protection" are detected as the corresponding prohibited settings KS2.

Thereafter, the prohibited setting confirmation screen generation unit 95 generates a screen displaying the two types of the corresponding prohibited settings KS1 (KS11, KS12) and KS2 (KS21, KS22) detected in step S14 as the prohibited setting confirmation screen GB (GB1) for the administrator SU and displays the prohibited setting confirmation screen GB1 (see FIG. 5) on the display unit 56b (step S15).

Figure 5:
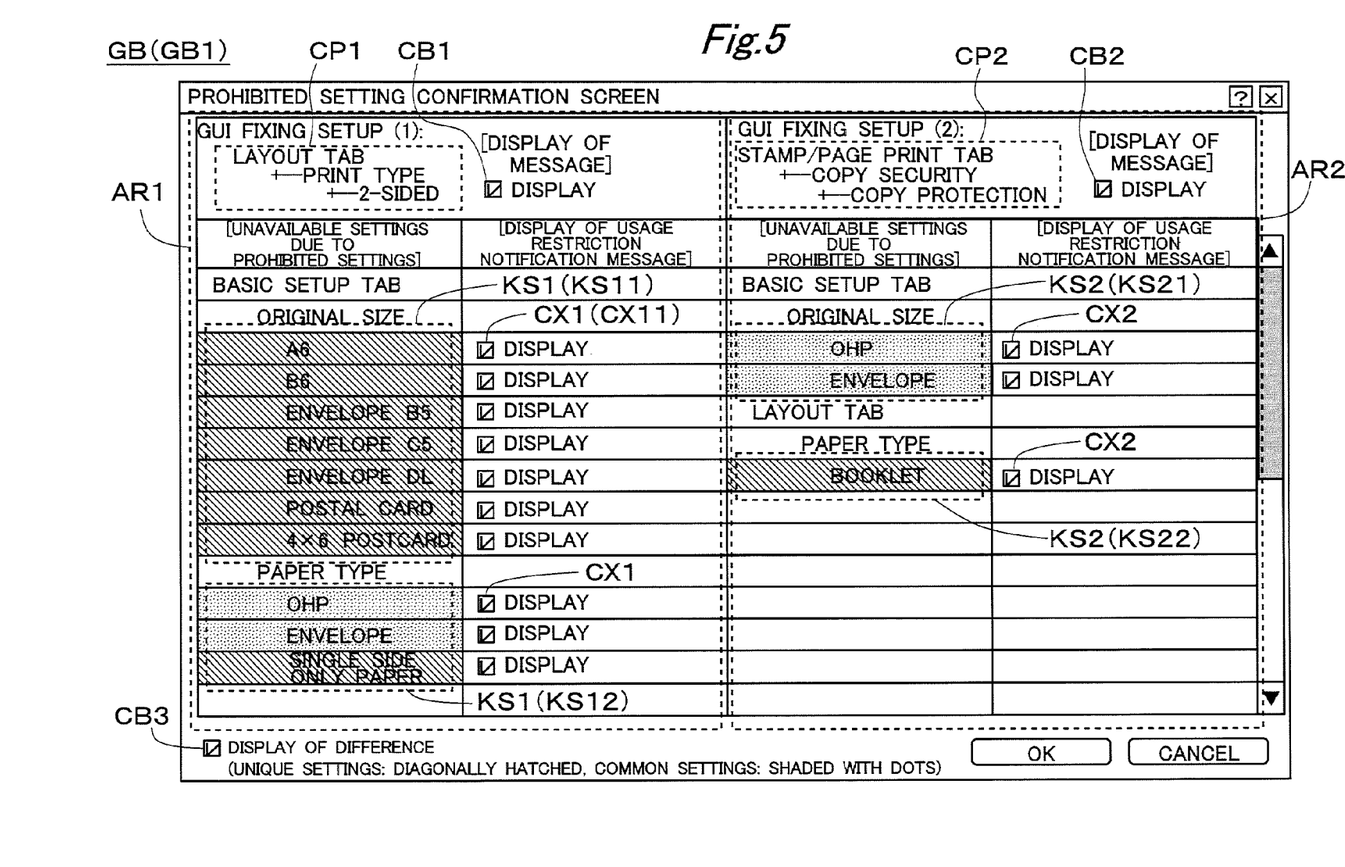
FIG. 5 illustrates a prohibited setting confirmation screen.

As illustrated in FIG. 5, the prohibited setting confirmation screen GB includes two display areas AR1 and AR2. The display area AR1 is on the left side of the prohibited setting confirmation screen GB, and the other display area AR2 is on the right side of the prohibited setting confirmation screen GB.

On the uppermost left side in the display area AR1, the content of the fixing instruction to fix the setting item "Print Type" in the "Layout" tab screen at the setting "2-Sided" is displayed as a fixing instruction content CP1.

On the right side of the fixing instruction content CP1, a checkbox CB1 is provided to select whether or not to display a message about fixing (a message indicating that the setting item "Print Type" is fixed at the setting "2-Sided" by the administrator SU). It can also be said that the checkbox CB1 is an instruction area for receiving a user instruction (selection instruction) as to whether or not to display the message about fixing in the printer driver screen GC.

When a checkmark is placed in the checkbox CB1, the customized printer driver screen (setting screen) GC1 displays an information icon CN on the left side of the setting item "Print Type" and the setting "2-Sided" of the setting item "Print Type" in the "Layout" tab screen as illustrated in FIG. 6. Furthermore, in response to a user operation of moving a mouse cursor CS close to that icon CN (a user operation relating to the setting "2-Sided"), a message box MB that displays a message about fixing (usage restriction) is displayed superimposed on the "Layout" tab screen. To be more specific, the message box MB is displayed in the vicinity of a setting area of the setting "2-Sided" (in the vicinity below the setting area of the setting "2-Sided") in the customized printer driver screen GC1. The message box MB displays a message including words such as "The usage of this setting is restricted by the administrator." This message indicates that a usage restriction regarding the setting of the setting item "Print Type" is imposed by the administrator (the settings other than the specific setting ("2-Sided") cannot be used). In other words, the message indicates that the setting item "Print Type" is fixed at the specific setting ("2-Sided") by the administrator. The checkbox CB1 is an element for setting the presence or absence of such a message.

When no checkmark is placed in the checkbox CB1 (no checkmark), neither the icon CN nor the message box MB described above is displayed in the customized printer driver screen GC.

In this way, whether or not to display the message box MB including the massage about fixing is switched in accordance with a user instruction given from the checkbox CB1. This enables the administrator SU to customize a printer driver by switching whether or not to display the message box MB in accordance with, for example, the needs of users and/or management-related reasons.

In the display area AR1, the corresponding prohibited settings KS1 (KS11, KS12) are also displayed below the fixing instruction content CP1 (more specifically, in an area in the proximity below the fixing instruction content CP1) as illustrated in FIG. 5. Specifically, a plurality of settings "A6," "B6," "Envelope B5," "Envelope C5," "Envelope DL," "Postal Card," and "4×6 Postcard" of the setting item "Original Size" are displayed as the corresponding prohibited settings KS11. A plurality of settings "OHP," "Envelope," and "Single Side Only Paper" of the setting item "Paper Type" are displayed as the corresponding prohibited settings KS12. In this way, the corresponding prohibited settings KS1 resulting from the fixing instruction with the fixing instruction content CP1 (prohibited settings corresponding to the setting "2-Sided" of the setting item "Print Type") are displayed in association (correspondence) with the fixing instruction content CP1.

On the right side of the corresponding prohibited settings KS1 (KS11, KS12), a checkbox CX1 for receiving input of whether or not to display a usage restriction notification message MS is provided for each of the settings. In the present example, the usage restriction notification message MS for each setting is a message indicating that the usage of a setting for enabling corresponding prohibited settings is restricted by the administrator. It can also be said that the usage restriction notification message MS is a message indicating that "the setting of interest (target setting) cannot be used because it is in a prohibited relationship with another setting that is restricted to be used by the administrator SU." The usage restriction notification message MS can be displayed during operation on the customized printer driver screen GC. It is noted that whether or not to display the usage restriction notification message MS can be switched in accordance with the content of a display instruction given from the above-described checkbox CX1. It can also be said that the checkbox CX1 is an instruction area for receiving a user instruction (selection instruction) as to whether or not to display the usage restriction notification message MS.

Figure 7:
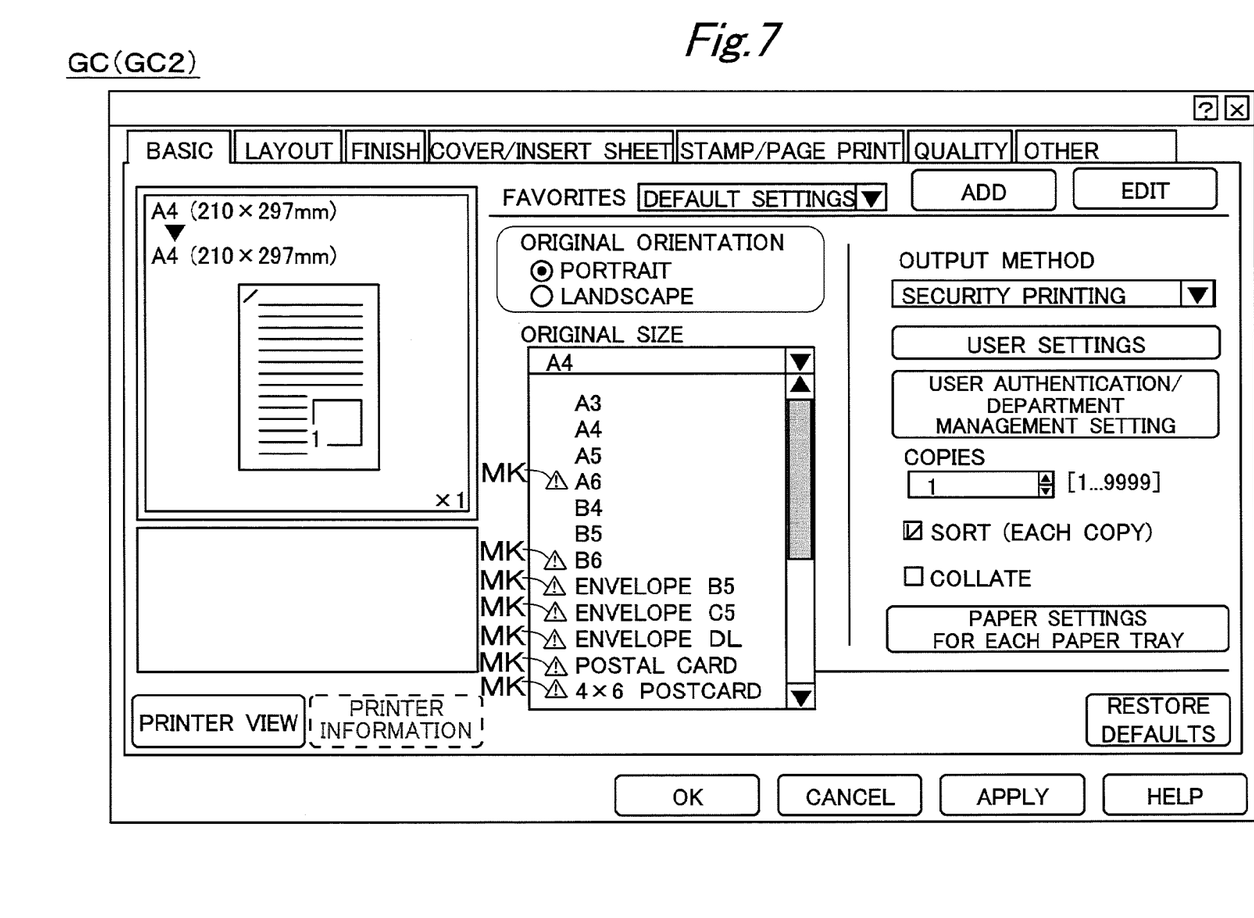
FIG. 7 illustrates a printer driver screen.

For example, when a checkmark is placed in all of the seven checkboxes that correspond respectively to the corresponding prohibited settings KS11, a customized printer driver screen GC2 displays an exclamation mark (attention-attracting mark) MK on the left side of each of those corresponding to the corresponding prohibited settings KS11 (e.g., "A6" and "B6") among a plurality of settings of the setting item "Original Size" as illustrated in FIG. 7. Note that the exclamation marks MK are displayed at positions corresponding to the corresponding prohibited settings KS11 in the customized printer driver screen GC2, regardless of the presence or absence of a checkmark in the above-described checkbox CX1.

When any of the settings with the exclamation mark MK is selected in the printer driver screen GC2, either of two types of message screens MG1 and MG2 is selectively displayed in accordance with the content of a display instruction given from the above-described checkbox CX1.

Specifically, when a setting (corresponding prohibited setting) with a checkmark in the checkbox CX1 (FIG. 5) is selected, the message screen MG1 (see FIG. 8) is displayed. When a setting (corresponding prohibited setting) without a checkmark in the checkbox CX1 is selected, the message screen MG2 (see FIG. 9) is displayed.

For example, when a checkmark is placed in the checkbox CX1 (CX11) for the setting "A6" as illustrated in FIG. 5, the following operation is executed. Specifically, when the setting "A6" (corresponding prohibited setting KS11) is selected from among a plurality of settings of the setting item "Original Size" in the printer driver screen GC2 in FIG. 7, the message screen MG1 illustrated in FIG. 8 is displayed on the display unit 56b.

Figure 8:
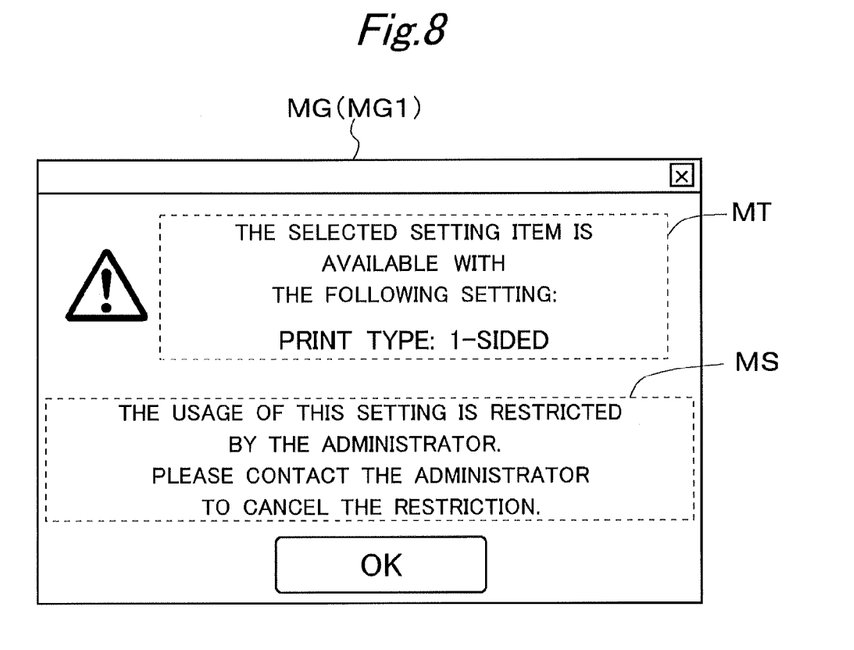
FIG. 8 illustrates a message screen.

As illustrated in FIG. 8, the message screen MG1 displays the usage restriction notification message MS on the relatively lower side and displays another message MT on the relatively upper side.

The message MT on the upper side contains words saying "The selected item (specifically, the setting "A6") is available with the following setting. Print Type: "1-Sided." This message MT indicates that the selected item (the setting "A6") is made available by changing the setting of the setting item "Print Type" (specifically, by changing the setting item "Print Type" to the setting "1-Sided").

The usage restriction notification message MS on the lower side contains words saying "The usage of this setting ("Print Type: 1-Sided") is restricted by the administrator. Please contact the administrator to cancel the restriction." The usage restriction notification message MS indicates that the setting item "Print Type" cannot be set at the setting "1-Sided" due to usage restriction by the administrator and that the user can contact the administrator to cancel the restriction. As a result, even users who do not know such a situation can easily know the situation (specifically, where the setting "1-Sided" cannot be used at present due to the usage restriction (fixing instruction) by the administrator, the usage restriction needs to be canceled by the administrator in order to make the setting "1-Sided" available (by extension, use the setting ("A6")), and the user may contact the administrator to cancel the usage restriction).

It can be said that the usage restriction notification message MS indicates, for example, that the selected setting ("A6") cannot be used due to a prohibited relationship between the selected setting ("A6") and the fixed setting (here, the setting "2-Sided" of the setting item "Print Type"). It can also be said that the usage restriction notification message MS is a message indicating that the corresponding prohibited setting ("A6") cannot be used due to the usage restriction by the administrator (usage restriction in accordance with the fixing instruction).

The usage restriction notification message MS enables the user to easily know the fact that the selected setting ("A6") cannot be used and this is because of the usage restriction by the administrator and the prohibited relationship resulting from the usage restriction.

Accordingly, when a user of the printer driver wants to use the setting ("A6"), the user can request the administrator SU to cancel the usage restriction in accordance with the content in the message screen MG1.

Figure 9:
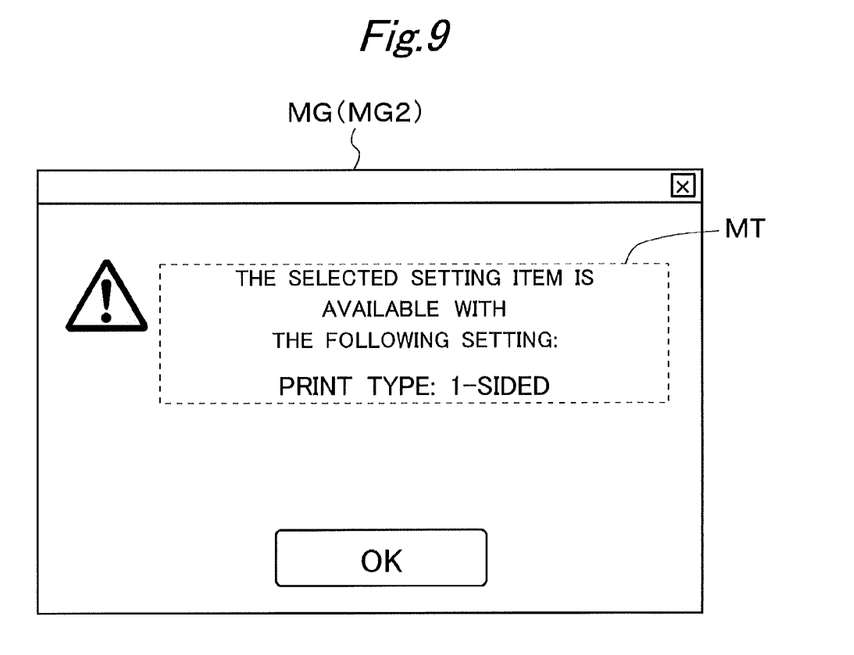
FIG. 9 illustrates a message screen.

When no checkmark is placed in the checkbox CX1 (CX11) (see FIG. 5) corresponding to the setting "A6," the following operation is executed. Specifically, when the setting "A6" (corresponding prohibited setting KS11) is selected from among a plurality of settings of the setting item "Original Size" in the printer driver screen GC2 in FIG. 7, the message screen MG2 as illustrated in FIG. 9 is displayed on the display unit 56b. In this way, the message screen MG2 as illustrated in FIG. 9 is displayed when no checkmark is placed in the checkbox CX1 in FIG. 5 for receiving input of whether or not to display the usage restriction notification message, the checkbox CX1 being provided for each setting.

The message screen MG2 (FIG. 9) is obtained by excluding the usage restriction notification message MS from the message screen MG1 illustrated in FIG. 8. The message screen MG2 contains only the message MT on the upper side out of the two types of messages MT and MS.

In this way, whether or not to display the usage restriction notification message MS when the user is attempting to set a corresponding prohibited setting KS1 in the customized printer driver setting screen GC1 can be switched in accordance with a user instruction given from a checkbox CX1. This enables the administrator SU to customize a printer driver by switching whether or not to display the usage restriction notification message MS in accordance with, for example, the needs of users and/or management-related reasons.

Reference is once again made to FIG. 5. As illustrated in FIG. 5, the display area AR2 on the right side has a configuration similar to that of the display area AR1 on the left side.

Specifically, on the uppermost left side in the display area AR2, the content of the fixing instruction to fix the setting item "Copy Security" in a "Stamp/Page Print" tab screen at the setting "Copy Protection" is displayed as a fixing instruction content CP2.

On the right side of the fixing instruction content CP2, a checkbox CB2 is displayed to receive input of whether or not to display a message about fixing in the printer driver screen. In the printer driver screen GC1, whether or not to display an icon CN and a message box MB similar to those described above is switched in accordance with the presence or absence of a checkmark in the checkbox CB2. To be more specific, whether or not to display the icon CN in the vicinity of a display field of the setting item "Copy Security" in the "Stamp/Page Print" tab screen and whether or not to display the message box MB regarding the icon CN can be switched.

In the display area AR2, the corresponding prohibited settings KS2 (KS21, KS22) are also displayed below the fixing instruction content CP2. Specifically, a plurality of settings "OHP" and "Envelope" of the setting item "Paper Type" are displayed as the corresponding prohibited settings KS21, and the setting "Booklet" of the setting item "Print Type" is displayed as the corresponding prohibited setting KS22. In this way, the corresponding prohibited settings KS2 resulting from the fixing instruction with the fixing instruction content CP2 (prohibited settings corresponding to the setting "Copy Protection" of the setting item "Copy Security") are displayed in association (correspondence) with the fixing instruction content CP2.

On the right side of the corresponding prohibited settings KS2 (KS21, KS22), a plurality of checkboxes CX2 for receiving input of whether or not to display a usage restriction notification message is provided for each of the settings. Similarly to the checkboxes CX1, the checkboxes CX2 also allow the user to make settings as to the presence or absence of the usage restriction notification message MS. Specifically, when a setting with an exclamation mark MK is selected in the customized printer driver screen GC2, either of the message screen MG1 (see FIG. 8) with the usage restriction notification message MS and the message screen MG2 (see FIG. 9) without the usage restriction notification message MS is selectively displayed in accordance with the presence or absence of a checkmark in the checkbox CX2 (see FIG. 5) of the setting.

As described above, the prohibited setting confirmation screen generation unit 95 generates a screen displaying the corresponding prohibited settings KS1 and KS2 in the areas AR1 and AR2 as the prohibited setting confirmation screen GB1 and displays the prohibited setting confirmation screen GB1 (see FIG. 5) on the display unit 56b. To be more specific, the prohibited setting confirmation screen generation unit 95 generates a screen displaying the corresponding prohibited settings KS1 and the corresponding prohibited settings KS2 side by side as the prohibited setting confirmation screen GB1 and displays the prohibited setting confirmation screen GB1 on the display unit 56b.

As illustrated in FIG. 5, a checkbox CB3 for selecting whether or not to give a "display of difference" between the corresponding prohibited settings KS1 and the corresponding prohibited settings KS2 is provided in the prohibited setting confirmation screen GB1 (specifically, in the vicinity of the lowermost left of the screen). When a checkmark is placed in the checkbox CB3, settings common to the corresponding prohibited settings KS1 and KS2 (common settings) are shaded with dots in the display as illustrated in FIG. 5, and settings unique to the respective corresponding prohibited settings KS1 and KS2 (unique settings) are diagonally hatched in the display. In other words, among a plurality of settings included in the corresponding prohibited settings KS1 and the corresponding prohibited settings KS2, common settings that are common to the corresponding prohibited settings KS1 and KS2 and unique settings that are not common to the corresponding prohibited settings KS1 and KS2 are displayed in different forms.

In this way, the prohibited setting confirmation screen generation unit 95 generates a screen identifically displaying the settings unique to the corresponding prohibited settings KS1 and the settings unique to the corresponding prohibited settings KS2 by diagonal hatching, as the prohibited setting confirmation screen GB1 and displays the generated screen on the display unit 56*b*. In the other words, the prohibited setting confirmation screen generation unit 95 generates a screen identifically displaying the settings common to the corresponding prohibited settings KS1 and KS2 by shading with dots, as the prohibited setting confirmation screen GB1 and displays the generated screen on the display unit 56*b*.

Through the above-described operations, the corresponding prohibited settings KS resulting from the fixing instruction (prohibited settings corresponding to the specific setting) are detected and presented to the administrator SU. Specifically, the prohibited settings (e.g., "A6" of "Original Size") resulting from the fixing instruction to fix the setting item "Print Type" at the setting "2-Sided" are detected as the corresponding prohibited settings KS1 (the prohibited settings corresponding to the setting "2-Sided"). Also, the prohibited settings (e.g., "OHP" of "Paper Type") resulting from the fixing instruction to fix the setting item "Copy Security" at the setting "Copy Protection" are detected as the corresponding prohibited settings KS2 (the prohibited setting corresponding to the setting "Copy Protection"). Then, the prohibited setting confirmation screen GB (see FIG. 5) displaying the corresponding prohibited settings KS1 and KS2 is generated, displayed on the display unit 56*b*, and presented to the administrator SU.

It is thus possible for the administrator SU before using a printer driver PD to know settings that are made unavailable in the printer driver PD due to fixing instructions to fix specific setting items at specific settings and prohibited settings resulting from the fixing instructions.

To be more specific, before the printer driver PD is used, the administrator SU can know the corresponding prohibited settings KS1 (e.g., the setting "A6" of another setting item "Original Size") that are made unavailable in the printer driver PD due to the setting item "Print Type" being fixed at the setting "2-Sided" and the prohibited settings resulting from the fixing of that setting item.

The administrator SU can also know the corresponding prohibited settings KS2 (e.g., the setting "OHP" of another setting item "Paper Type") that are made unavailable in the printer driver PD due to the setting item "Copy Security" being fixed at the setting "Copy Protection" and prohibited settings resulting from the fixing of that setting item, before the printer driver PD is used.

Furthermore, the screen displaying the corresponding prohibited settings KS1 (KS11, KS12) and the corresponding prohibited settings KS2 (KS21, KS22) side by side is generated as the prohibited setting confirmation screen GB1 (see FIG. 5) and displayed on the display unit 56*b*. This enables the administrator SU to compare (contrast) the corresponding prohibited settings KS1 and the corresponding prohibited settings KS2.

Among a plurality of settings included in the corresponding prohibited settings KS1 and the corresponding prohibited settings KS2, the common settings that are common to the corresponding prohibited settings KS1 and KS2 and the unique settings that are not common to the corresponding prohibited settings KS1 and KS2 are presented in different forms. To be more specific, the common settings ("OHP" and "Envelope") common to the corresponding prohibited settings KS1 and KS2 are shaded with dots in the display. The unique settings ("A6," "B6," "Envelope B5," "Envelope C5," "Envelope DL," "Postal Card," "4×6 Postcard," and "Single Side Only Paper") unique to the corresponding prohibited settings KS1 and the unique settings ("Booklet") unique to the corresponding prohibited settings KS2 are diagonally hatched in the display. The administrator SU can thus easily know and distinguish between the settings common to the corresponding prohibited settings KS1 and KS1 and the settings unique to the respective corresponding prohibited settings KS1 and KS2. The administrator SU can also easily know the settings unique to the corresponding prohibited settings KS1 and the setting unique to the corresponding prohibited settings KS2. Thus, when the administrator SU wants to permit the use of the setting "A6" unique to the corresponding prohibited settings KS1, the administrator SU can easily know the fact that the use of "A6" can be permitted by simply canceling only the fixed setting of "Print Type" (without cancelling the fixed setting of "Copy Security"). When the administrator SU wants to permit the use of the setting "OHP" common to the corresponding prohibited settings KS1 and KS2, the administrator SU can easily know the fact that both of the fixed settings of "Print Type" and "Copy Security" need to be cancelled.

When a checkmark is placed in the checkbox CB1 in the prohibited setting confirmation screen GB1 (see FIG. 5), the icon CN is displayed on the left side of "Print Type" in the printer driver screen GC1 (see FIG. 6), and when the mouse cursor CS is moved close to the icon CN, the message box MB is displayed. This enables the user of the printer driver PD to know, from the message box MB, the fact that "Print Type" is intentionally fixed by the administrator SU. Thus, the user of the printer driver PD can contact the administrator SU to request the cancellation of the fixed setting of "Print Type," for example.

When a checkmark is placed in a checkbox CX1 corresponding to a corresponding prohibited setting KS11 in the prohibited setting confirmation screen GB1 (see FIG. 5), the message screen MG (see FIG. 8) is displayed in the printer driver screen GC2 (see FIG. 7). To be more specific, when a setting with the exclamation mark MK (e.g., "A6") is selected in the printer driver screen GC2, the message screen MG (see FIG. 8) displaying the usage restriction notification message MS is displayed. This enables the user of the printer driver PD to know from the message screen MG the fact that the setting "A6" cannot be used because it is in a prohibited relationship with the setting "2-Sided" intestinally fixed by the administrator SU. The user of the printer driver PD can thus contact the administrator SU to request the permission of using the setting "A6," for example.

Note that it is also possible, in the GUI fixing setting screen GA illustrated in FIG. 4, to receive two or more fixing instructions that cannot actually be combined in the printing apparatus 10 through each tab screen TB. In other words, two or more types of fixing instructions may virtually be received.

For example, for specification reasons, it is impossible in the printing apparatus 10 to fix a setting item "Staple" at a setting "Left Corner" and to fix the same setting item "Staple" at another setting "Two Points (Left)". In other words, it is inherently impossible to realize these two types of fixation processing.

On the other hand, it is possible in a "Finish" tab screen (not shown) in the GUI fixing setting screen GA to select "Fixed (Grayed Out)" from the pull-down menus PM of both of the settings "Left Corner" and "Two Points (Left)" of the setting item "Staple." This makes it possible to receive both of the fixing instruction to fix the setting item "Staple" at the setting "Left Corner" and the fixing instruction to fix the setting item "Staple" at the setting "Two Points (Left)". When the button BN3 (see FIG. 4) in the GUI fixing setting screen GA is pressed here, the prohibited setting confirmation screen generation unit 95 generates the prohibited setting confirmation screen GB (GB2) as illustrated in FIG. 10 and displays the generated screen on the display unit 56b.

Figure 10:
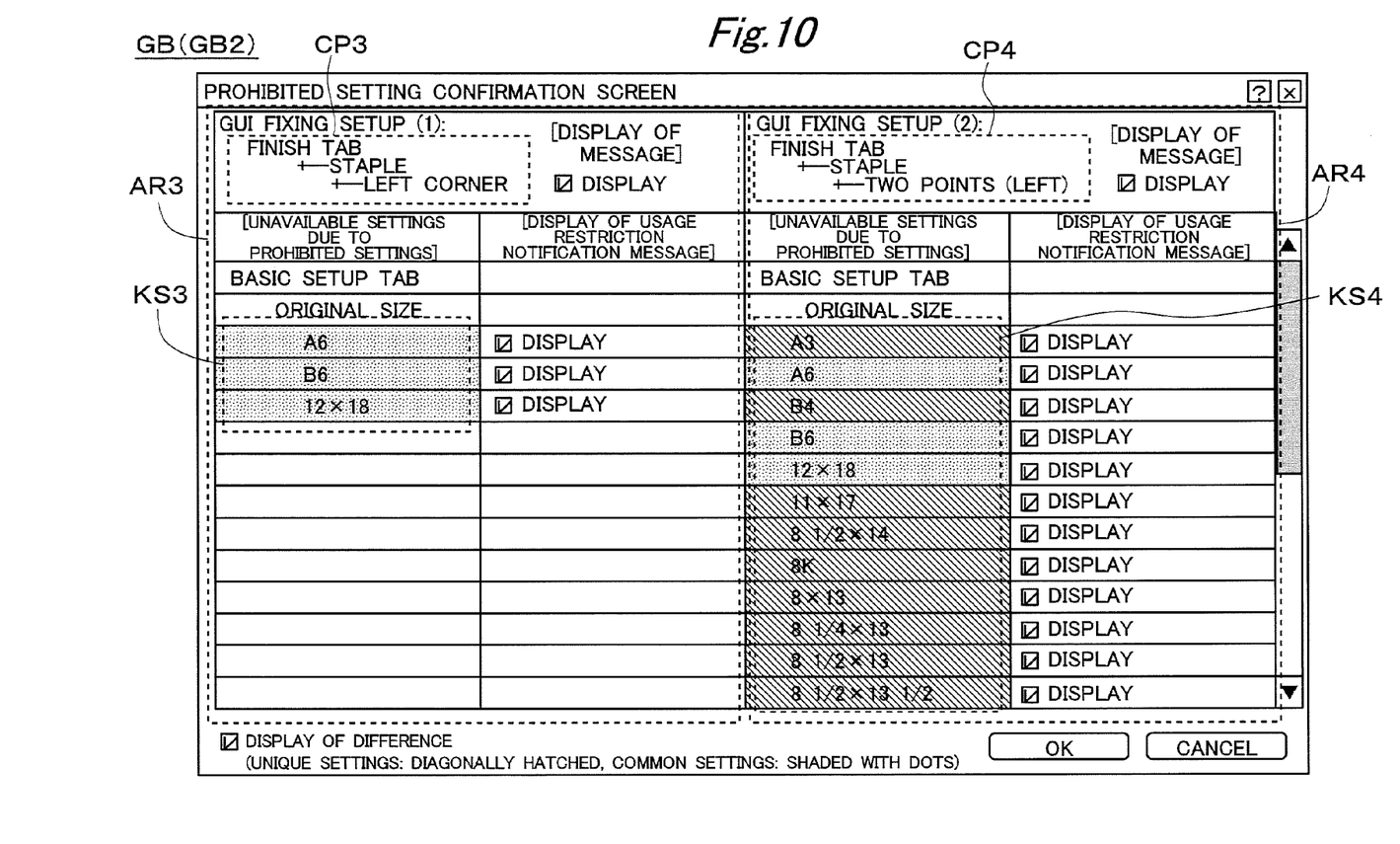
FIG. 10 illustrates a prohibited setting confirmation screen.

As illustrated in FIG. 10, the prohibited setting confirmation screen GB2 includes two display areas AR3 and AR4. The display area AR3 is on the left side of the prohibited setting confirmation screen GB2, and the other display area AR4 is on the right side of the prohibited setting confirmation screen GB2.

On the uppermost left side in the display area AR3, the content of the fixing instruction to fix the setting item "Staple" in the "Finish" tab screen at the setting "Left Corner" is displayed as a fixing instruction content CP3. Also, corresponding prohibited settings KS3 (settings "A6," "B6," and "12×18" of "Original Size") are displayed below the fixing instruction content CP3.

On the uppermost left side in the display area AR4, the content of the fixing instruction to fix "Staple" in the "Finish" tab screen at "Two Points (Left)" is displayed as a fixing instruction content CP4. Also, corresponding prohibited settings KS4 (settings "A3," "A6," "B4," "B6," "12×18" and the like of "Original Size") are displayed below the fixing instruction content CP4.

In this way, the corresponding prohibited settings KS3 and the corresponding prohibited settings KS4 are displayed side by side in the prohibited setting confirmation screen GB2. This enables the administrator SU to compare the corresponding prohibited settings KS3 and the corresponding prohibited settings KS4 and to consider, for example, which is preferable to fix the setting item "Staple" at the setting "Left Corner" or the setting "Two Points (Left)".

In other words, using the above-described customization program PG1 makes it possible not only to display in a comparative manner the corresponding prohibited settings KS of two types of settings that can actually be used in combination, but also to display in a comparative manner the corresponding prohibited settings KS of two types of settings (e.g., "Left Corner" and "Two Points (Left)") that cannot actually be used in combination.

It is, however, preferable that customization processing based on two types of fixing instructions that cannot inherently be used in combination is not confirmed. Thus, it is preferable that even if the button BN1 in the screen GA (see FIG. 4) is pressed in a state in which two types of such fixing instructions that cannot be used in combination have virtually been given, these fixing instructions are not confirmed and an error message or the like indicating that the selected combination is not available is displayed. For example, it is assumed that the button BN1 is pressed in a state in which "Fixed (Grayed Out)" is selected from the pull-down menus of both of the settings "Left Corner" and "Two Points (Left)" of the setting item "Staple" in the "Finish" tab screen (not shown) of the GUI fixing setting screen GA. At this time, it is preferable that those fixing instructions are not confirmed and an error message or the like indicating that the selected combination is not available is displayed.

3. Variations

While the above has been a description of an embodiment of the present invention, the present invention is not intended to be limited to the details described above.

For example, while the aforementioned embodiment describes a case in which the fixing instructions to fix the two setting items (specifically, "Print Type" and "Copy Protection") are received, the present invention is not limited thereto. A fixing instruction to fix a single setting item may be received, or fixing instructions to fix three or more setting items may be received.

While the aforementioned embodiment describes a case in which the corresponding prohibited settings KS1 and KS2 are displayed side by side in the prohibited setting confirmation screen GB, the present invention is not limited thereto, and the corresponding prohibited settings KS1 and KS2 may be vertically displayed.

While the aforementioned embodiment describes a case in which when a checkmark is placed in the checkbox CB3 in the prohibited setting confirmation screen GB, the settings common to the corresponding prohibited settings KS1 and KS2 are shaded with dots in the display and the settings unique to the respective corresponding prohibited settings KS1 and KS2 are diagonally hatched in the display, the present invention is not limited to this.

For example, when a checkmark is placed in the checkbox CB3 in the prohibited setting confirmation screen GB, the settings common to the corresponding prohibited settings KS1 and KS2 and the settings unique to the corresponding prohibited settings KS1 and KS2 may be displayed with backgrounds of different colors, such as a pink background for the common settings and a yellow background for the unique settings. That is, the common settings and the unique settings may be displayed in different background colors. Alternatively, the common settings and the unique settings may be displayed in different text colors. In this way, common settings and unique settings may be displayed in different colors (e.g., text colors and/or background colors).

While the aforementioned embodiment describes a case in which the customized (most up-to-date) printer driver PD is distributed from the administrator computer 50 to each client computer 30 and installed in the client computers 30, the present invention is not limited thereto.

For example, the so-called Point & Print functionality may be used for installation, in which the most up-to-date customized printer driver is installed in the administrator computer 50 and each client computer 30 copies thereonto the most up-to-date printer driver stored in the administrator computer 50.

While customization processing common to a plurality of users may be performed on a printer driver distributed to the users, the present invention is not limited thereto. For example, printer drivers on which individual customization processing corresponding to individual users has been performed may be distributed to the respective users. In other words, a printer driver on which individual customization processing has been performed may be distributed to each user. To be more specific, a printer driver on which different customization processing (fixing processing) from that for other general users has been performed may be distributed to a specific user. For example, a printer driver in which only the fixed setting "2-Sided" among the fixed settings "2-Sided" and "Copy Protection" has been canceled may be distributed to a user UA who wants to use "A6" that corresponds to one of the corresponding prohibited settings KS11 illustrated in FIG. 5. Also, a printer driver in which only the fixed setting "Copy Protection" among the fixed settings "2-Sided" and "Copy Protection" has been canceled may be distributed to a user UB who wants to use "Booklet" that corresponds to the corresponding prohibited setting KS22 (FIG. 5). Then, a printer driver in which the fixed settings "2-Sided" and "Copy Protection" remain unchanged may be distributed to the other users. This makes it possible to cope with the needs of each individual user.

While the aforementioned embodiment describes a case in which the administrator SU is notified of the corresponding prohibited settings KS1 and KS2 via the prohibited setting confirmation screen GB, the present invention is not limited thereto. The administrator SU may be notified of the prohibited settings KS1 and KS2 by audio from an audio output unit provided in the administrator computer 50.

The present invention may be embodied in various other forms without departing from the spirit or essential characteristics thereof. The embodiments disclosed in this application are to be considered in all respects as illustrative and not limiting. The scope of the invention is indicated by the appended claims rather than by the foregoing description, and all modifications or changes that come within the meaning and range of equivalency of the claims are intended to be embraced therein.

What is claimed is:

1. A non-transitory computer-readable recording medium storing a program for customizing a printer driver, the program causing a computer to execute the steps of:
    a) receiving, through operation input from an operator having administrator privileges, a fixing instruction to fix a specific setting item on the printer driver at a specific setting, the specific setting item being fixed on the printer driver so that the specific setting item is not changed by a user having user privileges,
    wherein the administrator privileges permit the operator to fix the specific setting item on the printer driver, and the user privileges prevent the user from fixing the specific setting item on the printer driver;
    b) detecting a setting of a setting item, the setting item being different from the specific setting item and, being in a prohibited relationship with the specific setting, as a corresponding prohibited setting resulting from the fixing instruction, after the specific setting is fixed during a fixing procedure by the operator having administrator privileges to fix the specific setting item; and
    c) notifying the operator having administrator privileges of the corresponding prohibited setting detected in the step b) during the fixing procedure.

2. The recording medium according to claim 1, wherein the step a) includes the step of:
    a-1) receiving a first fixing instruction to fix a first setting item on the printer driver at a first setting and a second fixing instruction to fix a second setting item on the printer driver at a second setting,
    the step b) includes the steps of:
    b-1) detecting a setting that is a setting of a setting item different from the first setting item and that is in a prohibited relationship with the first setting as a first corresponding prohibited setting; and
    b-2) detecting a setting that is a setting of a setting item different from the second setting item and that is in a prohibited relationship with the second setting as a second corresponding prohibited setting, and
    the step c) includes the step of:
    c-1) presenting, to the operator, a screen displaying the first corresponding prohibited setting and the second corresponding prohibited setting inline.

3. The recording medium according to claim 2, wherein in the step c-1), among a plurality of settings included in the first corresponding prohibited setting and the second corresponding prohibited setting, a common setting that is common to both the first corresponding prohibited setting and the second corresponding prohibited setting and a unique setting that is not common to the first corresponding prohibited setting and the second corresponding prohibited setting are displayed in different forms.

4. The recording medium according to claim 3, wherein in the step c-1), the common setting and the unique setting are displayed in different colors.

5. The recording medium according to claim 1, wherein the step c) includes the step of displaying a predetermined screen showing the corresponding prohibited setting detected in the step b), and
the predetermined screen is a screen displaying the corresponding prohibited setting in association with a content of the fixing instruction.

6. The recording medium according to claim 1, wherein the step c) includes the step of displaying a predetermined screen showing the corresponding prohibited setting detected in the step b),
the predetermined screen includes a first instruction area for receiving a user instruction as to whether or not to display a first message on a setting screen of the printer driver that has been customized, and
the first message is a message indicating that a usage restriction regarding a setting of the specific setting item is imposed by an administrator.

7. The recording medium according to claim 1, wherein the step c) includes the step of displaying a predetermined screen showing the corresponding prohibited setting detected in the step b),
the predetermined screen includes a second instruction area for receiving a user instruction as to whether or not to display a second message when the corresponding prohibited setting is being attempted to be set on a setting screen of the printer driver that has been customized, and
the second message is a message indicating that usage of a setting for enabling the corresponding prohibited setting is restricted by an administrator.

8. An information processing apparatus for customizing a printer driver, comprising:
    a reception unit configured to receive, through operation input from an operator having administrator privileges, a fixing instruction to fix a specific setting item on the printer driver at a specific setting, the specific setting item being fixed on the printer driver so that the specific setting item is not changed by a user having user privileges,
    wherein the administrator privileges permit the operator to fix the specific setting item on the printer driver, and the user privileges prevent the user from fixing the specific setting item on the printer driver;
    a detection unit configured to detect a setting of a setting item, the setting item being different from the specific setting item and being in a prohibited relationship with the specific setting, as a corresponding prohibited setting resulting from the fixing instruction, after the specific setting is fixed during a fixing procedure by the operator having administrator privileges to fix the specific setting item; and a notification unit configured to notify the operator having administrator privileges of the corresponding prohibited setting detected by the detection unit during the fixing procedure.

9. The information processing apparatus according to claim 8, wherein
- the reception unit is configured to receive a first fixing instruction to fix a first setting item on the printer driver at a first setting and a second fixing instruction to fix a second setting item on the printer driver at a second setting,
- the detection unit is configured to detect a setting that is a setting of a setting item different from the first setting item and that is in a prohibited relationship with the first setting as a first corresponding prohibited setting, and detect a setting that is a setting of a setting item different from the second setting item and that is in a prohibited relationship with the second setting as a second corresponding prohibited setting, and
- the notification unit is configured to present, to the operator, a screen displaying the first corresponding prohibited setting and the second corresponding prohibited setting inline.

10. The information processing apparatus according to claim 9, wherein
- the notification unit is configured to present, to the operator, a screen in which, among a plurality of settings included in the first corresponding prohibited setting and the second corresponding prohibited setting, a common setting that is common to the first corresponding prohibited setting and the second corresponding prohibited setting and a unique setting that is not common to the first corresponding prohibited setting and the second corresponding prohibited setting are displayed in different forms.

11. The information processing apparatus according to claim 10, wherein the common setting and the unique setting are displayed in different colors.

12. The information processing apparatus according to claim 8, wherein
- the notification unit is configured to display a predetermined screen showing the corresponding prohibited setting detected by the detection unit, and
- the predetermined screen is a screen displaying the corresponding prohibited setting in association with a content of the fixing instruction.

13. The information processing apparatus according to claim 8, wherein
- the notification unit is configured to display a predetermined screen showing the corresponding prohibited setting detected by the detection unit,
- the predetermined screen includes a first instruction area for receiving a user instruction as to whether or not to display a first message on a setting screen of the printer driver that has been customized, and
- the first message is a message indicating that a usage restriction regarding a setting of the specific setting item is imposed by an administrator.

14. The information processing apparatus according to claim 8, wherein
- the notification unit is configured to display a predetermined screen showing the corresponding prohibited setting detected by the detection unit,
- the predetermined screen includes a second instruction area for receiving a user instruction as to whether or not to display a second message when the corresponding prohibited setting is being attempted to be set on a setting screen of the printer driver that has been customized, and
- the second message is a message indicating that usage of a setting for enabling the corresponding prohibited setting is restricted by an administrator.

\* \* \* \* \*